US012784301B2

(12) United States Patent
Pergel

(10) Patent No.: US 12,784,301 B2
(45) Date of Patent: Nov. 3, 2026

(54) ELIMINATION TOURNAMENT DRAW ARRANGEMENT

(71) Applicant: Cristian Pergel, Ottawa (CA)

(72) Inventor: Cristian Pergel, Ottawa (CA)

(73) Assignee: PERGLE Labs Inc., Ottawa (CA)

( * ) Notice: Subject to any disclaimer, the term of this patent is extended or adjusted under 35 U.S.C. 154(b) by 398 days.

(21) Appl. No.: 18/241,111

(22) Filed: Aug. 31, 2023

(65) Prior Publication Data

US 2024/0245992 A1 Jul. 25, 2024

Related U.S. Application Data

(60) Provisional application No. 63/402,924, filed on Aug. 31, 2022.

(51) Int. Cl.

| | |
|---|---|
| ***G06F 3/04842*** | (2022.01) |
| ***A63F 13/537*** | (2014.01) |
| ***G06F 3/04817*** | (2022.01) |
| ***G06T 11/26*** | (2026.01) |
| ***G06T 11/60*** | (2006.01) |

(52) U.S. Cl.
CPC ............ *A63F 13/537* (2014.09); *G06T 11/26* (2026.01); *G06T 11/60* (2013.01)

(58) Field of Classification Search
CPC ....... G06T 11/206; G06T 11/60; G06Q 10/06; G06F 16/287; G06F 40/205; G06F 9/451; G06F 3/04842; G06F 2203/04803; A63F 13/537
See application file for complete search history.

*Primary Examiner* — Lawrence S Galka

(57) ABSTRACT

A method for creating compact visual representations, or renderings, of elimination tournament draws. The method generates a compact rendering for a more inclusive bracket by composing the pair of compact renderings of its two included brackets of the previous round, along the direction designated for the more inclusive bracket's round, and always alternating the direction of composition, between horizontal and vertical, from one round to the next. The rendering of the draw is the same as that of the Final bracket. The method has the advantage of creating draw renderings that fit entirely on commonly used visual displays, such as a paper sheet or a computer display, allowing functionality that requires all the elements to be in view together, with a structure that gives the viewer more clues with respect to the relations between the draw elements.

16 Claims, 10 Drawing Sheets

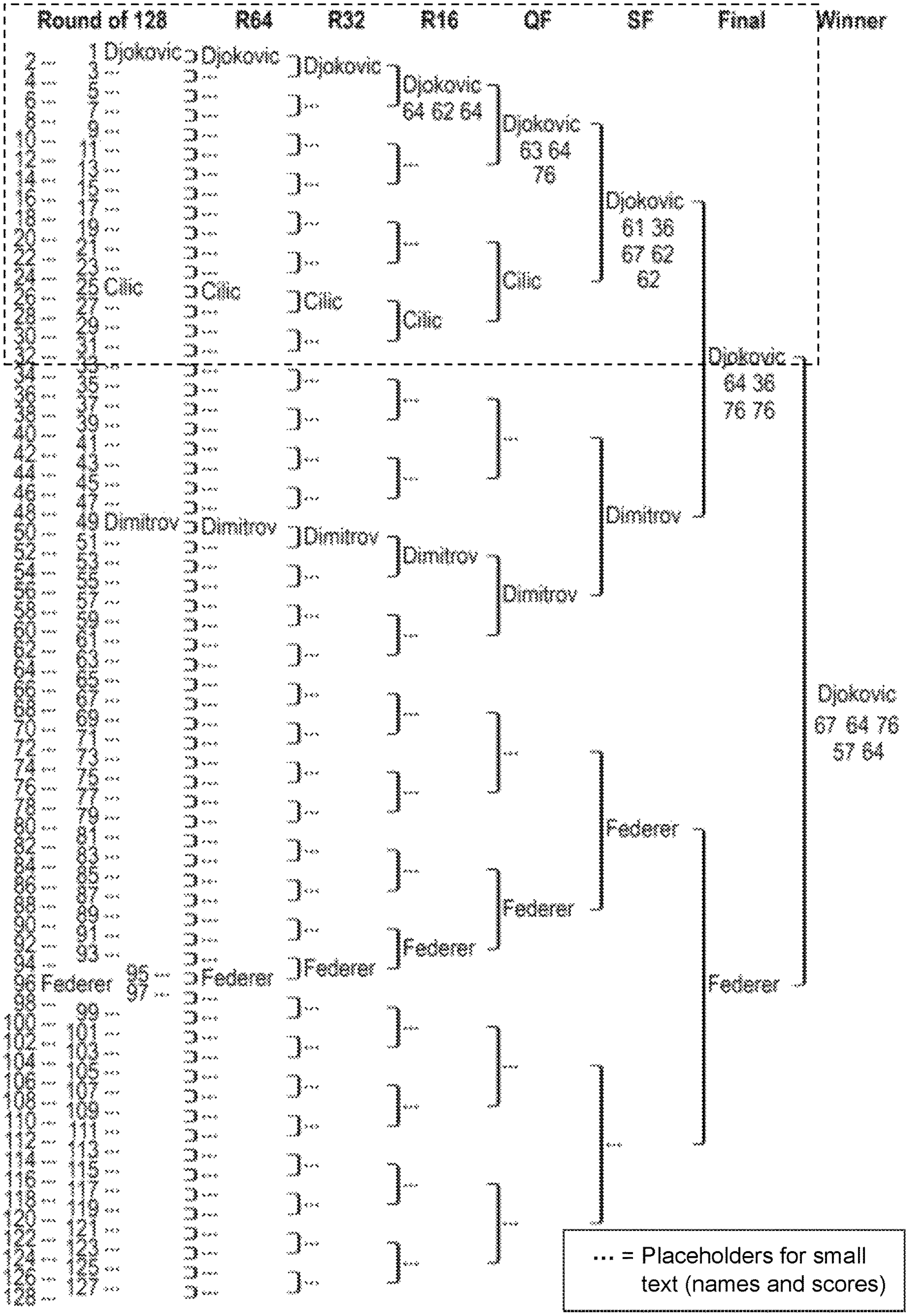
FIG. 1a (Background)

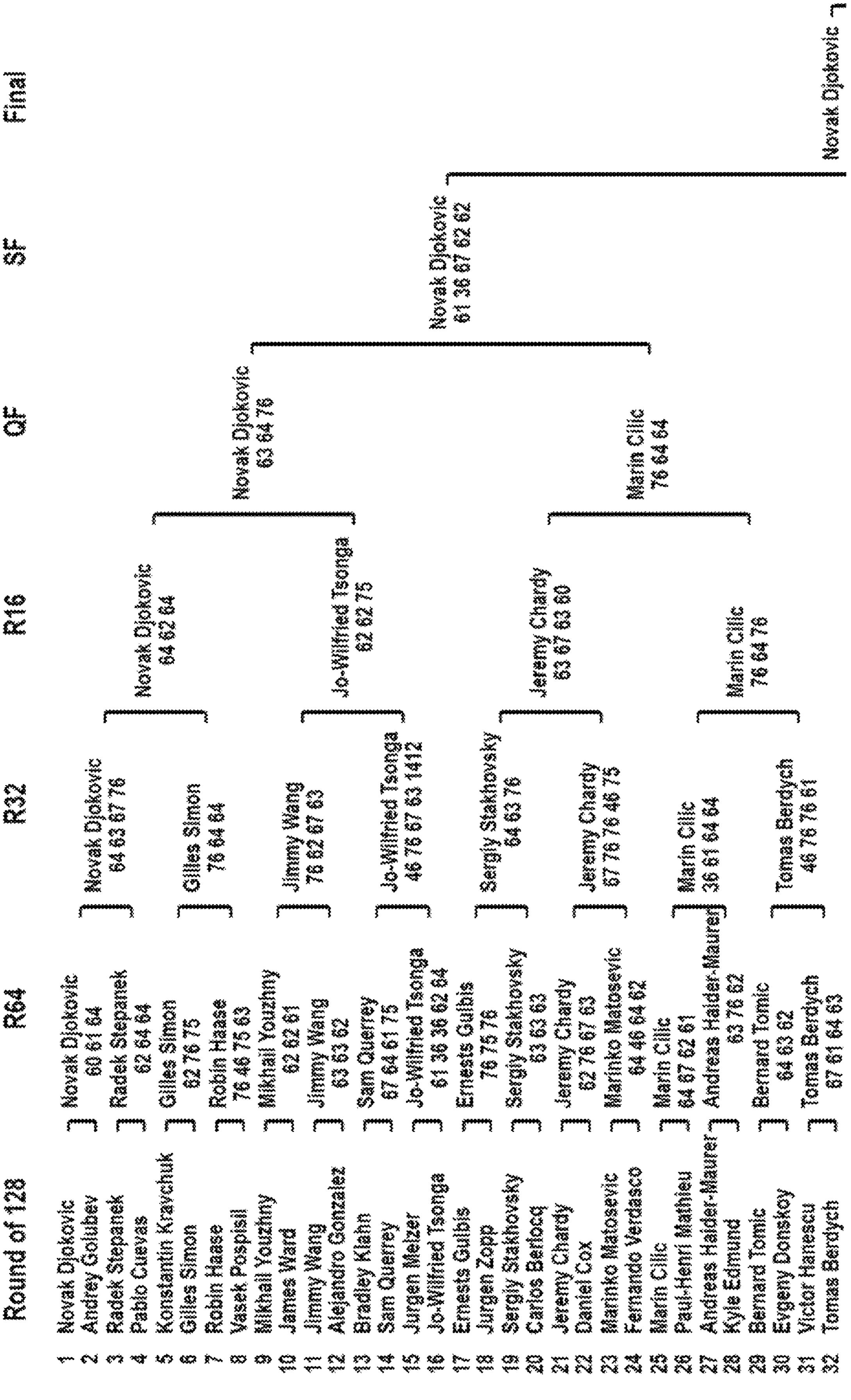
FIG. 1b (Background)

ELIMINATION TOURNAMENT DRAW ARRANGEMENT

CROSS-REFERENCE TO RELATED APPLICATIONS

This application claims the benefit of provisional patent application Ser. No. 63/402,924, filed 2022 Aug. 31 by the present inventor.

BACKGROUND OF THE INVENTION

Elimination draws are used in tournaments (competitions of skill or luck) to stipulate which participants are paired to play matches, based on a participant ordering and dependent on match results, to decide an eventual winner or a partial ranking.

One example is that of a draw of 32 participants, all of which start in the first round; they are paired to play 16 matches in the first round, to determine the 16 participants—called first-round winners—that advance to the second round; the process continues until the 5th round, which is the Final round, to which 2 participants advance and play the Final round's only match. The winner of the final match is the winner of the tournament.

Other possible cases can exclude certain constraints mentioned or implied above, including, but not limited to: that the number of actual participants in the first round be 32, or a power of 2; that there be 5 rounds; that the draw complete only after a unique winner is determined; that each participant play a match in any given round to advance to the next round; that new participants cannot be added in a later round; that participants who lose a match cannot play in subsequent rounds.

Visual representations of elimination draws, henceforth called "renderings", are commonly created on paper sheets, computer and TV screens, or boards for public viewing, using text and graphical elements, to show the match contestant pairings at different rounds, match-related information, relationships between elements.

Traditional Arrangement

The method traditionally used to create elimination draw renderings is to place the contestants participating in each round on one column, ordered such that each pair of contestants that plays a match in that round appear consecutively in that round's column. For each current round that is not the last one played, starting from the first, a new column, for the next round, is formed next to the current round's column, containing the winners of the matches of the current round, each winner being aligned with the pair of contestants, of the current round's column, that played the match won by that winner. Commonly, the last column contains only the winner of the Final round and of the draw.

Before it is known which participants are a round's contestants, the round's column contains blank spaces, possibly drawn as empty rectangles, to be filled in later. Lines are commonly used to connect each pair of contestants who play a match in one round with the contestant, listed in the column for the next round, which advances to that next round, or with the blank space reserved for that yet-to-be-decided participant.

The traditional arrangement requires a relatively large space for the first column. Because the winners listed in each current round's column must be aligned with the pairs, of the previous round, that played the matches that the said winners won, the column corresponding to the current round cannot, in general, be much shorter than the column for the previous round, even though the number of contestants is only half. The consequence is that the contestant list for each round extends over a relatively long size vertically, with gaps between contestants that increase with each successive round. Horizontally, each round requires a width that can accommodate the names of the participants, which results in a total draw width that is proportional with the column width multiplied by the number of rounds. By necessity, much unused space is embedded in this arrangement, increasing with the number of participants, with the width reserved for the name columns, and with the number of rounds. The non-rectangular shape of the overall draw additionally increases the unused space when rendered on rectangular media. The total unused space correspondingly increases the total space needed.

SUMMARY OF THE INVENTION

Technical Problem

Elimination draws of 64 or 128 participants are common, and handling them can become burdensome in the traditional arrangement: they require multiple pages when printed, or significant scrolling or virtual page changing when displayed on a computer screen; when presented on boards for public viewing, the large height relative to text size requires a corresponding increased absolute height and results in a relatively large difference in viewing angles between the top and the bottom of the rendering. FIG. 1*a* and FIG. 1*b* show a complete 128-size draw and, separately, its top quarter.

The larger the required area, the more difficult it is to grasp how the elements of the draw relate to each other. For instance, it could be hard to see at once all the matches and opponents of the winner of a 128-participant, 7-round draw.

In the list of participants, presented as a long column in the traditional arrangement, it is difficult to see which section of each stage each participant belongs to, and difficult to resolve, for an arbitrary pair of participants, at which stage they would oppose each other.

When used in computer applications, the traditional arrangement does not allow draw-related functionality that would require all elements of a draw to be in view at the same time. For instance, it wouldn't be able to preview the required win paths of two participants selected by the user, and the match they would play provided they win their matches before that.

Solution to Problem

The present disclosure describes a method of arranging elimination draw renderings that addresses the issues of unused space and inconvenient shape mentioned above, allowing for a more compact rendering, more suitable for fitting inside rectangular areas.

The method creates a compact rendering for the whole draw—which is the rendering of the one Final round bracket—out of compact bracket renderings of rectangular shape, created for earlier rounds. To obtain the bracket renderings for any given round, the renderings of the brackets of the previous round are composed, by pairs, along the given round's designated direction, which is always the crosswise of the composition direction for the previous round; the essence of the method for creating the compact rendering is to assign composition directions to each round such that the direction always changes from horizontal to vertical or from vertical to horizontal between each round and the next.

The compact rendering allows the entirety of a large draw to be shown at once on a page or a computer display. When rendered on a computer display, it is possible to highlight only the parts that relate to an element selected by the user, in the context of the whole draw. For example, the user could select a participant, resulting in the highlighting of all matches and opponents of that participant, visible at the same time on the display; or the user could select a round, resulting in the highlighting of all matches of that round, with their contestants, scores, and winners, visible at the same time on the display.

The relatively positioned rectangle based visual structure resulting from this method allows a viewer to easily grasp and find the relations among participants, or between participants and the brackets of the draw. For instance, all seeded players can be placed in the top-left corner of the rendering of their respective seed bracket; the participants who don't play in the first round, or those who are fed directly into a later round, can be shown in collapsed bracket renderings.

DESCRIPTION OF DRAWINGS

FIG. 1*a* shows a complete 128-participant draw rendering created using the traditional arrangement. When fitting it onto a regular size page, the text size is too small and the content is unbalanced: too dense in some areas and with too much unused space in others. The dashed rectangle encloses the first quarterfinal bracket B(Q(3), 0).

FIG. 1*b* shows the top quarter of the FIG. 1*a* draw, roughly corresponding to the first quarterfinal bracket. It illustrates that, when using normal text size, only about a quarter of the draw fits on a regular size page in the traditional arrangement.

DETAILED DESCRIPTION OF THE INVENTION

Language, Notation, Theory

Figure 2A:
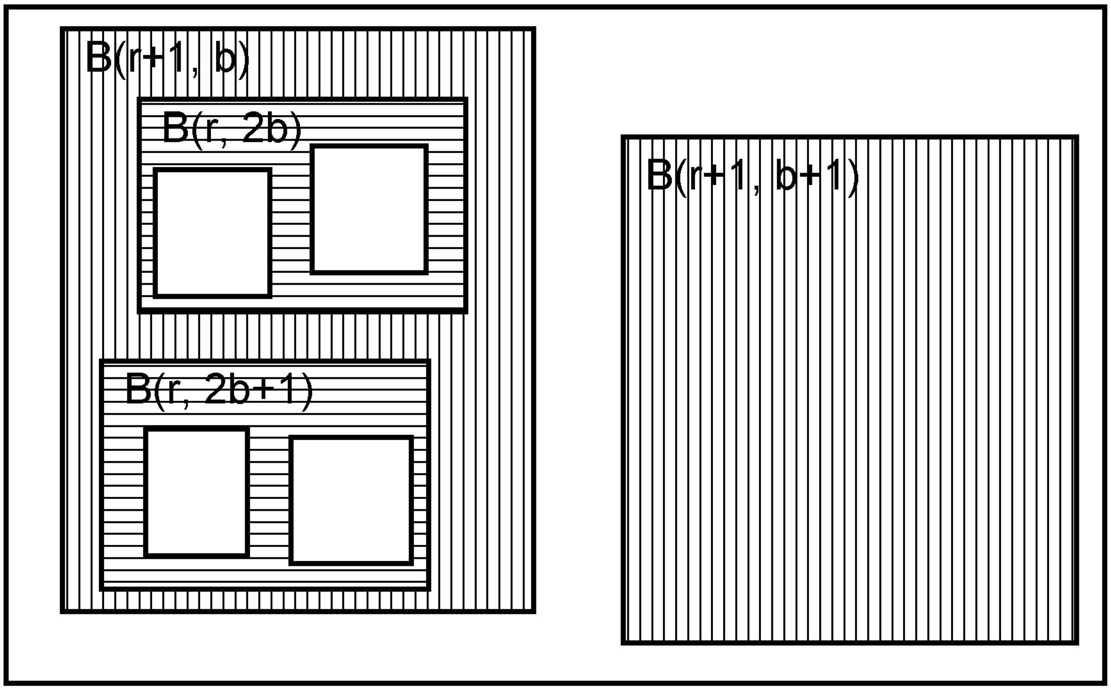
FIG. 2*a* illustrates the composition of bracket renderings using the method of the present invention. Specifically, it shows how the rendering of a bracket of round R(r+1) is composed of the renderings of the bracket's child bracket renderings, of round R(r). The hatch lines covering a bracket rendering show the designated direction for the round to which the rendered bracket belongs. In this case, the designated direction at round R(r) is horizontal, D(r)=H, and the designated direction for round R(r+1) is vertical, D(r+1)=V. The figure shows that the renderings of brackets B(r, 2×b) and B(r, 2×b+1) are composed along D(r+1), which is vertical, their projections onto a horizontal axis overlapping substantially, and their projections onto a vertical axis not overlapping. The renderings of the R(r) brackets are themselves compositions of previous round bracket renderings, and the R(r+1) bracket renderings, B(r+1, b) and B(r+1, b+1), are themselves composed to create a bracket rendering for the next round.

The following are used in mathematical expressions:

"+" is the addition operator;

"−" is the subtraction operator;

"×" is the multiplication operator;

"^" is the exponent operator;

">" means "greater than";

"≥" means "greater than or equal to";

"<" means "less than";

"≤" means "less than or equal to";

"{" and "}" are set enclosing markers.

Emphasized text is used for variables.

Strong text is used for defined constants and functions.

A tournament "participant" represents an individual, a pair, a team, an object, or any entity that has an identifying name and takes part in the contests of the tournament.

An "elimination draw" outlines the progression of a tournament in which, at each successive stage some participants are eliminated, until a pre-determined number of participants, commonly one, remain in the draw and is/are declared the winner(s). The state of the draw changes during the progression of the tournament.

The draw specifies the contests of the tournament by reference to an ordered list of participants created at the initial stage of the tournament, called "draw list". We use the notation "P(p)" for the participant in position p of the draw list, with p starting at 0. The members of the draw list are "actual participants".

"BYE" is a pseudo-participant, not present on the draw list. By convention, when p is a number that is not a valid position on the draw list, P(p) is the BYE participant.

Each participant has a "seed number". "Actual seed" numbers are assigned to a subset of the draw list by the tournament organizer. By convention, all the participants that do not have an actual seed number are assigned the same "nominal seed" number, one that is greater than all the actual seed numbers, or arbitrary if no actual seed number was assigned; the BYE participant receives a "BYE seed" number, one that is greater than any actual seed numbers and any nominal seed number. When a participant is referred to in relation to its seed number, the participant is called a "seed". When a participant S has an actual seed number, S is a "seeded participant". If participant P1 has seed number s1 and participant P2 has seed number such that s1<s2, we say the P1 is a "higher seed" than P2, and that P2 is a "lower seed" than P1.

A "round" is a stage of an elimination draw. Rounds are named in chronological order. For each applicable number r>1, the "r-th round", also written "R(r)", is the first round that immediately follows R(r−1); R(1) is the first round of the draw, also written "R1". R(2), which immediately follows R(1), is the second round; R(3) is the third round; etc.

Each round R is determined by its "R list", which is an ordered list of "slots". A slot of round R is referred to as an "R slot". Each slot is in one of two states: "empty" or "filled". When a slot's state is filled, the slot contains a reference to a participant. Slots can change from empty to filled during a tournament's progression; they never change from filled to empty. Once a slot is filled with a reference to participant P, S keeps the reference to P permanently, the reference never changing.

For simplicity, when a slot S of an R list is filled, we may say that the slot is the reference that it contains. If slot S of round R contains a reference to a participant P, when there is no ambiguity, S may be simply referred to as P, and we say that participant P is a member of the R list, or that the R list contains participant P. Multiple slots of an R list may contain references to the same participant P, in which case it may be said that participant P is included multiple times in the R list.

When a draw is "set up", slots of R1 are filled with references to all the participants from the draw list. The seed numbers of the R1 list are commonly specified before the participants are known, thereby forcing the assignment of participants to slots once the participants are known, based on the participants' seed numbers.

Initially, each participant from the draw list is included exactly once in the R1 list. In single elimination draws, the R1 list always contains exactly one reference to each member of the draw list, until the end of the tournament; in certain other kinds of elimination draws, the same participant may eventually be included on multiple positions of the R1 list.

A "match" M of round R, also called an "R match", is a pairing of two consecutive R list members, referred to as the "contestants" of M; the contestants are slots of the R list. If match M of round R has a contestant C that references participant P, we also say that: "P is a match M participant"; "P is a round R participant"; "C is a round R contestant". Contestants being R list members, a round's list is a "contestant list".

When C1 and C2 are the two contestants of match M, which reference participants P1 and P2, we say that P1 and P2 "play" match M; P1 and P2 are each other's "opponent" in match M. Also, C1 and C2 are each other's opponents, and they play match M.

A match is played between its participants to decide the match "outcome": which one of the participants is the "winner" of the match, the other one becoming the "loser" of the match. Here, "playing" denotes any activity or event that can settle the match winner and loser, including walk-over, retirement during the match, disqualification, etc.

In elimination draws, if a participant W of the R(r) list is the winner of a match of round R(r), W then also becomes a member of the R(r+1) list, meaning that a slot of the R(r+1) list will be filled with a reference to W, and we say that W "advances" from R(r) to R(r+1). For each applicable r, all participants of the R(r+1) list are winners of R(r), therefore members of the R(r) list.

For any given round R, the "R match list" is an ordered set of all R matches. If p is a number such that C1 and C2 are in positions 2×p and 2×p+1 of the R list, where the first position in a list is 0, then C1 and C2 play a match in round R, that occupies position p of the R match list. Matches are identified by the round they belong to and their position in their respective round match list.

A given participant may be included in a round via contestants of one or multiple matches. When round R contains participant P, and P is a loser in all R matches in which P is a contestant, we say that P was "eliminated" in round R.

The winner of the match M in position p of the R(r) match list always advances to the position p of the R(r+1) list. Before the outcome of match M is known, the slot in position p of the R(r+1) list is empty.

The length of the R match list is half the length of the R list. The R(r+1) list consists of the winners of all matches of R(r), being the same length as the R(r) match list and half the length of the R(r) list.

Besides naming the rounds in chronological order—first, second, third, etc.—the rounds can be referred to by their number of contestants: the "round of n" is the round whose list has n members.

By definition, elimination draws include a round of 2, whose contestant list has 2 members. The round of 2 contains one match, the "Final", written "Mf", played between the round's two contestants. The round of 2 is the "Final round", written "Rf"; the round of 4 is the "Semifinal round"; the round of 8 is the "Quarterfinal round". Each round of an elimination draw has a contestant list and a match list whose lengths are powers of 2.

In an elimination draw, the "nominal number of rounds" is a number "Nr" such that the Final round is the Nr-th round of the draw, R(Nr). Each round R(i), with i taking all values from 1 to Nr, is a "nominal round". The nominal number of rounds is the same as the number of nominal rounds.

In an elimination tournament, the length of the R1 list, written "N1", is the "nominal size of the draw". N1 is equal to 2^Nr.

The round of 2, the Final round, is the "nominal last round" of an elimination draw; the Semifinal round is the nominal second-last round; the Quarterfinal round is the nominal third-last. For each applicable number q, "Q(q)" denotes the "nominal q-th last round" of an elimination draw. It follows that Rf, the round of 2, is the same as Q(1); the Semifinal round, which is the round of 4, is Q(2); the Quarterfinal round, which is the round of 8, is Q(3). For each applicable q, the length of the Q(q) list is 2^q.

An "actual match" is a match associated with a real event, whose outcome is not known in advance and is determined by its participants playing the match. Both participants of an actual match are actual participants from the draw list.

A "nominal match" is a match not associated with a real event, and its outcome is known at the time its contestants are filled. At least one contestant of a nominal match is a BYE, the other one being the winner. A participant that is a contestant in a nominal match—always opposing a BYE—can be filled in later, after the nominal match's round, and possibly after later rounds, take place.

Actual matches are played during the stage of their respective rounds; a round R that contains actual matches starts the first time an actual R match is played, and it ends as soon as the outcomes of all its matches are known. After it starts, and before it ends, a round is in progress. Multiple rounds of an elimination draw can be in progress at the same time.

In an elimination draw, a participant P may be in position p of the round R(r+1) list, r≥1, without having played an actual match in position p of the round R(r) match list; in this case, the match in position p of R(r) must be a "nominal match" that P plays against pseudo-participant BYE, and P is the match's winner; the R(r) list must then contain one or more contestants referencing the BYE pseudo-participant.

An elimination draw can also include nominal matches in which both contestants are BYEs, these nominal matches being called "BYE-only matches". A BYE-only nominal match in position p of the R(r) match list results in a BYE contestant in position p of the R(r+1) list.

Commonly, the winners of the actual matches of R(r), and no other actual participants, advance to R(r+1); in this case, the losing participants of R(r) matches are eliminated in round R(r). This is the case for single elimination tournaments.

There are elimination tournaments that are not single elimination. It is possible for an actual participant P to advance to R(r+1) without having won an actual R(r) match. This is usually done by repeating P via additional contestants of the R1 list, and having each additional contestant that references P face BYE contestants as opponents in each round up to, and including, R(r). These additional contestants can be filled in after their rounds end because they all play nominal matches.

The last round in which actual matches are played is the "actual last round" of the elimination draw, written "Rz". In an elimination draw, the actual last round may be different from the nominal last round: a tournament may stop before round Rf, the Final round, immediately after a round R(z), with z<Nr; z is then the "actual number of rounds".

When the actual last round, Rz, is the Final round, the Final being an actual match, a unique winner of the draw is determined. When Rz is not the Final round, its match list has 2, 4, or more matches, and the same respective number of draw winners is determined.

The "Winner round", written "Rw", is a pseudo-round that is the next round after Rz. By convention, the winners of Rz, the last round in which actual matches are played, advance to round Rw, forming the Rw list, which is the list of winners of the draw. No actual matches are played in Rw.

By convention, round R(0), also written "R0", is a pseudo-round that comes immediately before R1, in which no actual matches are played. The R0 match list consists of nominal matches whose winners are, in order, the members of the R1 list. All participants of the R1 list are winning participants of nominal matches of R0, opposing BYEs in their R0 matches. The winner of the nominal match in position p of the R0 match list is the same as the participant referenced by the slot in position p of the R1 list. Every match of R0 is fully described by its winner, the opponent always being a BYE.

A "not-played" match is a match whose outcome is not known; the match becomes "played" when its outcome becomes known. An actual match's state changes from not-played to played after the actual participants that are its two opponents play the match. A nominal match is not-played when one of its contestants is a participant that is not known yet; when the participant becomes known, the winner becomes known, being the participant, therefore the nominal match becomes played at the same time the participant becomes known.

A "virtual round" is a round in which no actual or nominal matches are played, which comes after Rz. Rw is always the first virtual round. When Rz is the round of 2, which is the Final round, Rw is the round of 1 and is the only virtual round of the draw, whose match list is empty. In general, virtual rounds can follow Rw: if Rz is the round of 2^v then Rw is the round of 2^(v−1); all rounds of 2^i, where i is a value from 0 to v−1, are virtual rounds.

The match list of a virtual round consists of "virtual matches", except for the round of 1 whose match list is empty. The contestants of a virtual match are always unspecified. A virtual match stays not-played permanently. Virtual matches, like actual and nominal matches, are identified by their round and their position in the match list.

Brackets

In elimination draws, the first-round matches are played between C(2×i) and C(2×i+1), for each applicable number i: a number such that 2×i and 2×i+1 are positions in the R1 list. For example, the first-round matches are played between C(0) and C(1), between C(2) and C(3), etc. The second-round matches are played between one of {C(0), C(1)} and one of {C(2), C(3)}; between one of {C(4), C(5)} and one of {C(6), C(7)}; in general: between one of {C(4×i), C(4×i+1)} and one of {C(4×i+2), C(4×i+3)}, for each applicable i. Each contestant of each match of round R(r) is always a member of a contiguous section of length 2^(r−1) of the R1 list.

The "bracket" of match M of round R includes all the contestants of list R1 from which the two participants of M will be selected, and all the matches played to determine the two participants of M, together with the outcomes of all included matches. M's winner is also the winner of M's bracket. If B is the bracket of match M, then M is bracket B's match.

In round R1, the bracket of any match M1 consists of the two contestants of match M1, the match M1, and the winner of M1. In round R(r), r>1, the bracket of any match Mr includes:

match Mr;

the two contestants of match Mr;

the winner of match Mr;

the two brackets of the matches of R(r−1) that the two participants of Mr won to advance to R(r).

When a bracket Br includes a bracket Bp, and Bp includes a contestant C, we also say that Br includes C, applied recursively. Similarly, when a bracket Br includes a bracket Bp, and Bp includes a match M, we also say that Br includes M, applied recursively. A bracket may be expressed as the set of numbers that are the R1 list positions of all the contestants included in the said bracket.

For any round R, the ordered set of all brackets of R constitute the "R bracket list". For each applicable r≥1 and b≥0, bracket "B(r, b)" is the bracket of match M(r, b), in position b of the R(r) bracket list. The set {C(b*(2^r)+i)} of size 2^r, with i taking all the values from 0 to 2^r−1, is the section of R1 from which exactly two participants are eventually selected to play in R(r), as opponents in match M(r, b).

Using these definitions, the winner of match M(r, b) is the same as the winner of bracket B(r, b). The winner W(r, b) is included in bracket B(r, b); however, the contestant C(r+1, b) of R(r+1), which references W(r, b), is not included in B(r, b).

The first-round brackets have two positions: {0, 1}, {2, 3}, etc.; second-round brackets have 4 positions: {0, 1, 2, 3}, {4, 5, 6, 7}, etc.; third-round brackets have 8 positions: from 0 to 7, from 8 to 15, etc. The one Final round bracket, named the "Final bracket", written "Bf", encompasses all the N1 positions of R1. In an elimination draw, Bf is the same as B(Nr, 0).

Any round before the Final round includes at least two brackets. The set of all brackets of a round R defines an R1 list partitioning into equal length contiguous sequences.

For generality, we define B(0, j) as the one-position bracket: { }, with j taking all values from 0 to N1−1. Bracket B(0, j) includes pseudo-match M(0, j) and its winner W(0, j). All brackets B(0, j) are members of the R0 bracket list. B(0, j) includes contestant C(j) and the participant referenced by it is its winner: W(0, j).

The two brackets directly included in B(r, b) are the brackets B(r−1, 2×b) and B(r−1, 2×b+1), for each r and b such that the three are valid brackets. For instance, the first bracket of the second round, B(2, 0), which is the set {0, 1, 2, 3}, includes the first two brackets of the first round, B(1, 0) and B(1, 1), which are, respectively, the sets {0, 1} and {2, 3}.

The bracket inclusion relationships define a binary tree of brackets, at the root of which is the bracket of the Final match, written "Bf", which includes all the positions of the R1 list. The leaf nodes of the bracket tree are all the R0 brackets, which are sets of one position of the R1 list: B(0, i)={i}, where 0≤i<N1.

The two directly included brackets of the same bracket form a "bracket pair". Given a bracket that is a parent node in the bracket tree, its bracket pair is the two child nodes of the parent node. Each bracket that is not Bf is a member of exactly one bracket pair. B(1,0) and B(1,1) are a bracket pair; B(2,8) and B(2,9) are a bracket pair, when the brackets exist in the draw. In general, B(r, 2×i) forms a bracket pair with B(r, 2×i+1) and no other bracket; and vice versa. The bracket pair of any bracket of R0 is the empty set.

Depending on the context, we use "bracket" to mean either a list of positions of R1, or the whole corresponding subtree in the binary tree of brackets, together with any item exclusively associated with each bracket in each round, recursively.

A bracket B(r, b) of round R(r) contains contestants and matches of each round from R(1) to R(r−1). B(r, b) includes exactly one match of R(r): M(r, b); and it includes exactly two contestants from R(r), which are the contestants of match M(r, b). If P is a participant of M(r, b), then P is the winner of exactly one match of bracket B(r, b) in each round from R(1) to R(r−1). Each of the B(r, b) matches in which P is a winner, one per round, has a contestant containing a reference to P. The "win path of P to match M(r, b)" is the ordered list, LC, of the said contestants, one contestant per round from R(1) to R(r). If P is not the winner of M(r, b), either because M(r, b) is not-played, or because P is its loser, then LC is also the "win path of P in bracket B(r, b)". If P is the winner of M(r, b), then the win path of P in B(r, b) is the ordered list that begins with the members of LC, in order, and includes one additional contestant, C(r+1, b), added at the end. C(r+1, b) is the contestant of round R(r+1) that references the winner of bracket M(r, b). If P is not the winner of M(r, b) and BB is a bracket that includes B(r, b), then P's win path in B(r, b) is also a "short win path of P in bracket BB".

The win path of P in bracket B(r, b) is written "WP(P, r, b)". For arbitrary valid P, R(r), and B(r, b), the win path WP(P, r, b) may or may not exist.

For arbitrary valid P and BB, there may be none, one, or multiple short win paths of P in bracket BB. In single elimination draws, there can be none or one short win path for Pin BB.

All participants of an elimination draw have a win path in Bf, the Final bracket. In single elimination draws, each actual participant has exactly one win path in Bf. The draw winners have the longest win paths, of length Nz+1, Nz being the actual number of rounds. When the actual number of rounds is the same as the nominal number of rounds, the draw has one winner, and its win path is of length Nr+1.

Each tree level in a draw's bracket tree corresponds to a round of the elimination draw. Level 1, which is the level of the root node, is the level of the round of 2, the Final round; level 2 is the level of the round of 4, the Semifinal round; in general, level n is the level of the round of 2^n. The level of the leaf nodes is the level of R0.

In a visual depiction of a bracket tree, the first child of any parent node is always placed on the left and the second child on the right. All the brackets of the level of round R, taken in order from left to right, form the R bracket list; the brackets' associated matches form the R match list; the pairs of contestants of the bracket's associated matches form the R list. The contestants of the brackets of the level of R0, taken in order, form the R1 list.

A "bracket switch" is a transformation of a bracket tree that consists of changing the order of the two child brackets of a pair, while keeping the descendants of each child bracket attached to the original child bracket, in effect switching the order of the two subtrees rooted in the child brackets. By switching the order of the two brackets of any bracket pair, we obtain a new draw, in which the matches, with their scores, outcomes, and participants don't change. A draw obtained by doing any number of bracket switches is "equivalent" to the original draw. In the equivalent draw obtained by switching brackets, all the rounds are the same as those of the original draw; on the other hand, the R list of a round R is in general different between the original draw and the equivalent draw.

Given an original draw, an equivalent "normalized draw" is obtained by performing bracket switches on the original draw's bracket tree such that, for each bracket pair, the highest seed of the first bracket of the pair is not lower than the highest seed of the second bracket. A draw can be normalized when the seed numbers of its R1 list participants are known. If all the seed numbers are different, the normalization is unique; when multiple participants have the same seed numbers, multiple normalized draws of the same original draw may be possible.

The Final bracket, Bf, of an elimination draw, containing all the draw's actual participants and all matches with their outcomes, fully describes the draw. Similarly, considering an arbitrary bracket B of a draw, B fully describes its "associated draw", which is a "subdraw" of the original draw, whose draw list is the ordered section, of the original draw list, that is included in bracket B, and whose matches are the original draw's matches that are included in B.

A bracket's associated draw is an elimination draw, to which the foregoing elimination draw related definitions and notation, including nominal draw size, R1 list, nominal number of rounds, actual number of rounds, apply independently of its containing draw.

Summary of Notation

- R1—the first round.
- Rf—the Final round.
- Rz—the actual last round, the last round in which actual matches are played.
- Rw—the winner round, the Rw list containing the draw winners.
- R0—pseudo-round that precedes R1.
- R(r)—the r-th round of an elimination draw, $r \geq 0$.
- Q(q)—the q-th last round of an elimination draw, $q \geq 1$.
- N1—the nominal size of the draw, the same as the size of the R1 list.
- Nr—the nominal number of rounds, the same as the number of nominal rounds.
- Nz—the actual number of rounds.
- P(p)—the participant in position p of the draw list, $p \geq 0$.
- C(r, c)—the contestant that is in position c of the R(r) list, $c \geq 0$.
- C(c)—the same as C(1, c).
- M(r, m)—the match that is in position m of the R(r) match list, $m \geq 0$.
- W(r, m)—the winning participant of match M(r, m).
- L(r, m)—the losing participant of match M(r, m).
- B(r, b)—the bracket that is in position b of the R(r) bracket list, $b \geq 0$.

Using the above, the following are true:

$$R(r) = Q(Nr + 1 - r);$$

$$N1 = 2^{\wedge}Nr;$$

$$Nz \leq Nr;$$

$$Rz = R(Nz);$$

$$Rw = R(Nz + 1);$$

M(r, m), a match of round R(r), is played between C(r, 2×m) and C(r, 2×m+1);

C(r+1, m) of round R(r+1) references W(r, m), the winner of M(r, m) of round R(r).

The pair (r, b) uniquely identifies bracket B(r, b) within a draw, the pair being the bracket's identity. Similarly (r, m) is the identity of match M(r, m) and of winner W(r, m); (r, c) is the identity of C(r, c); p is the position identity of P(p); r is the round number identity of R(r).

Renderings

A "draw rendering" is a visual representation of a draw, actualized on a physical surface called a "visual display". Visual displays include, but are not limited to, electronic displays. A "bracket rendering" is the draw rendering of a bracket's associated draw; a draw rendering is the rendering of its Final bracket rendering.

A draw rendering reflects the current state of the draw; the rendering of the same draw changes during the progression of the tournament, as slots are filled and matches are played. A rendering can be created before a draw is set up, at any time while it is in progress, or after it is complete.

A draw rendering may present the contestants and winners of the matches, the match scores, guesses about the winners or match scores, the results of guesses, or any information related to the draw or its elements.

Draw and bracket renderings are composed of "visual elements". Visual elements consist of "visual matter" placed on, or missing from an area of, a visual display. Visual matter includes, but is not limited to: text, graphical elements, colors, styling. Visual matter expresses information commonly relating to participant names, seed numbers, match scheduling information, match results, cues to element states and relationships between elements.

Each visual element of a draw has an "identity", which uniquely identifies it within the draw. For instance, an identity may consist of the identity of the bracket a visual element is associated with, together with the type of visual element, where the type may be an enumeration including "score", "winner name", "round", etc.

A composition of visual elements is a rendering. A visual element may be "nil", in which case the visual element occupies no area on the visual display. A blank visual element is a visual element that does not include any visual matter and occupies a non-zero area on the visual display. A composition of nil visual elements is a nil rendering. A composition of blank visual elements is a blank rendering.

A visual element may be rendered in a "faint" version, in which case we call it a faint visual element. The faint version consists of visual matter intended to have reduced visibility, thereby highlighting the normal, non-faint visual elements. The faint version of a visual element may not include any visual matter, being simply a blank visual element.

A bracket rendering consists of its associated visual elements and its child bracket renderings. The visual elements associated with bracket B(r, b) may include visual elements related to: round R(r); match M(r, b); winner W(r, b); the contestants of M(r, b); a win path of either participant of M(r, b); a guess of the outcome of M(r, b); any other information linked to the bracket.

A bracket rendering includes the renderings of the bracket's included brackets. A "collapsed" bracket rendering is the rendering of a bracket in which the renderings of all included brackets are nil, the collapsed bracket rendering being reduced to a summary.

We define two "directions": "horizontal", also written "H"; and "vertical", also written "V". In any two-dimensional surface, having chosen the horizontal direction to be an arbitrary direction, the vertical direction will be orthogonal to the horizontal direction. The horizontal and vertical directions are each other's "crosswise" direction. If d is a direction, we write "~d" to mean "the direction that is the crosswise of d"; it follows that: V=~H and H=~V.

A "straight rectangular area" is a four-sided area having a pair of opposite sides aligned with the horizontal direction and the other pair of opposite sides aligned with the vertical direction.

Given a direction d—one of H or V—we say that the renderings of the two brackets of a pair are "composed along d" when the two renderings are placed on the visual display such that their orthogonal projections onto an axis in direction d do not substantially overlap, and their orthogonal projections onto an axis in direction ~d overlap substantially.

The Method

Figure 2B:
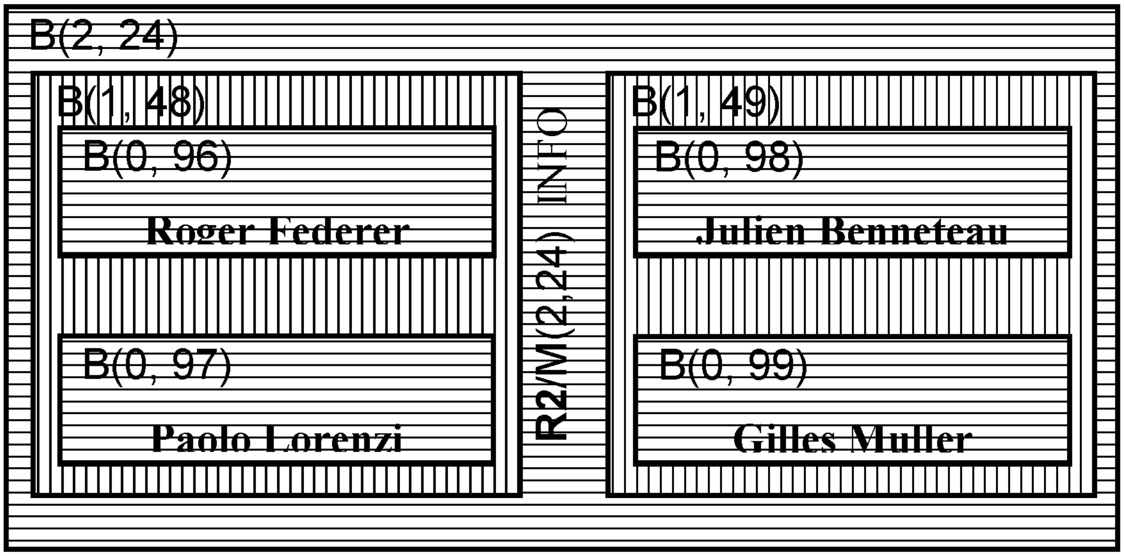
FIG. 2*b* shows an example of how the rendering of one bracket of R(2) is obtained by composing its descendant brackets of rounds from R(0) to R(2), with additional information presented as visual elements placed within the margin and gap area. In this case, the chosen designated direction for R(0) is horizontal. The figure shows how the designated direction changes from horizontal in R(0) to vertical in R(1) and to horizontal in R(2).
Figure 3:
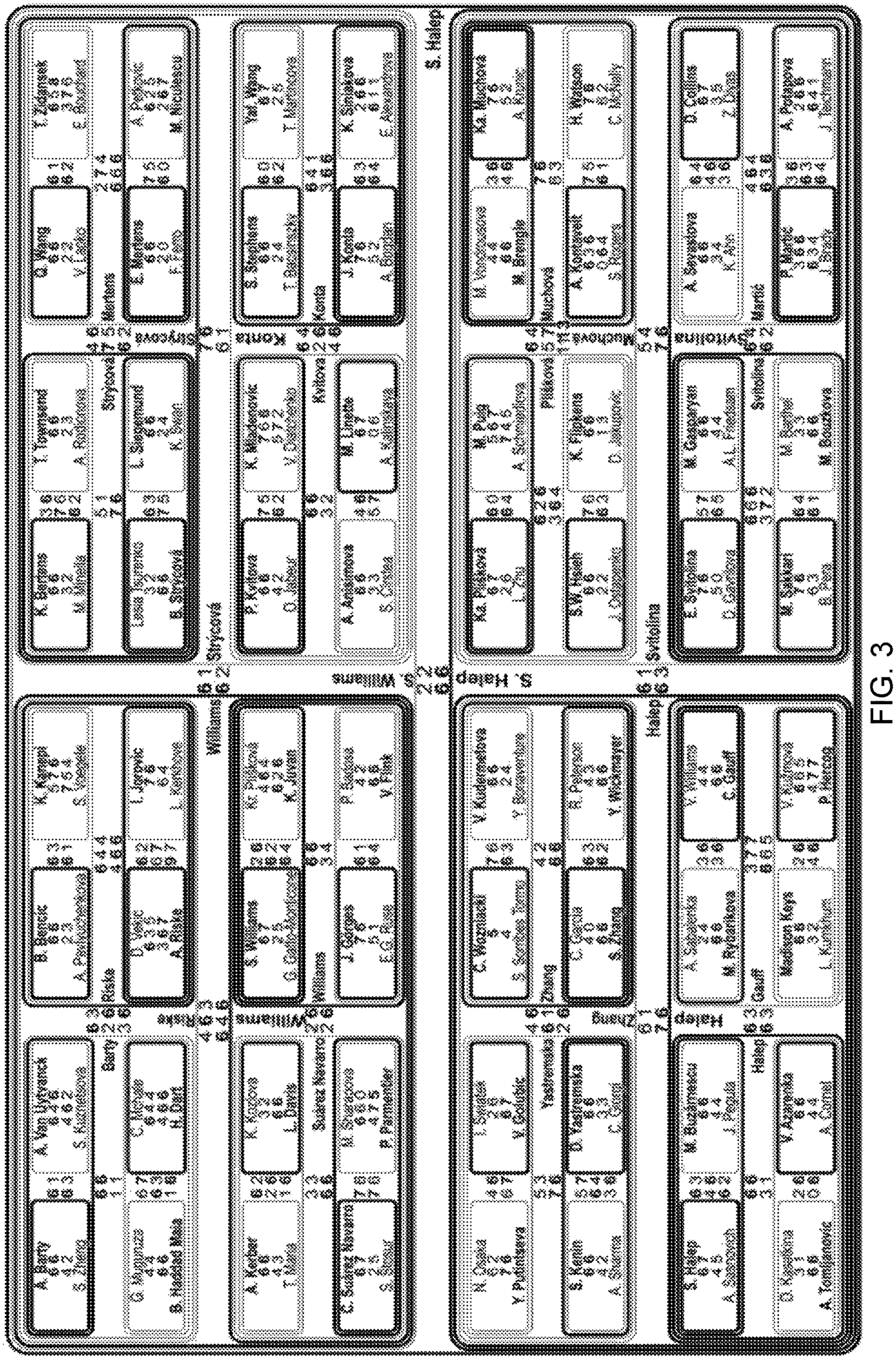
FIG. 3 shows an example of a complete single-elimination 128-participant draw rendered using the compact arrangement. In this example, the spacing and margins accommodate scores, winner names, and borders whose thicknesses indicate the side of the winner. The recursive inclusion of brackets in one another, and in effect, the tree bracket, are reflected in the respective inclusion of the rectangles of the bracket renderings in one another. The root of the draw bracket tree is the Final bracket, whose rendering is the whole content, included in the largest rectangle; the leaf nodes of the draw bracket are the R0 brackets, rendered here as visual elements containing the names of the participants.
Figure 4:
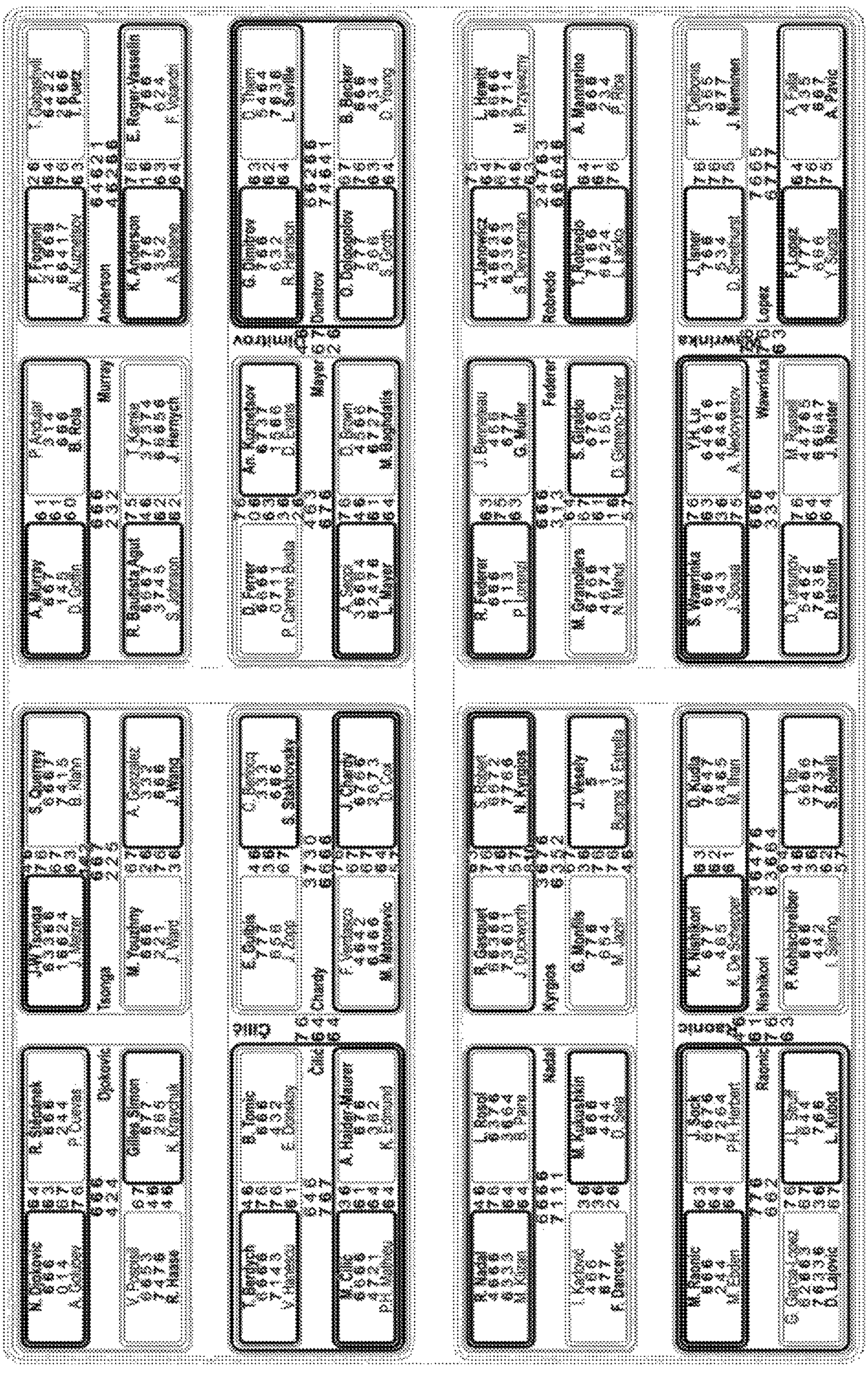
FIG. 4 shows an example of a rendering of a single-elimination 128-participant draw at a stage when all the matches of the rounds R(1) to R(3) are played, some of the matches of R(4) are played, and none of the matches of R(5) to R(7) are played. The renderings of the brackets corresponding to matches that are not-played are missing scores and winner names, and their surrounding borders are drawn with interrupted line, to indicate that the bracket is not complete.
Figure 5A:
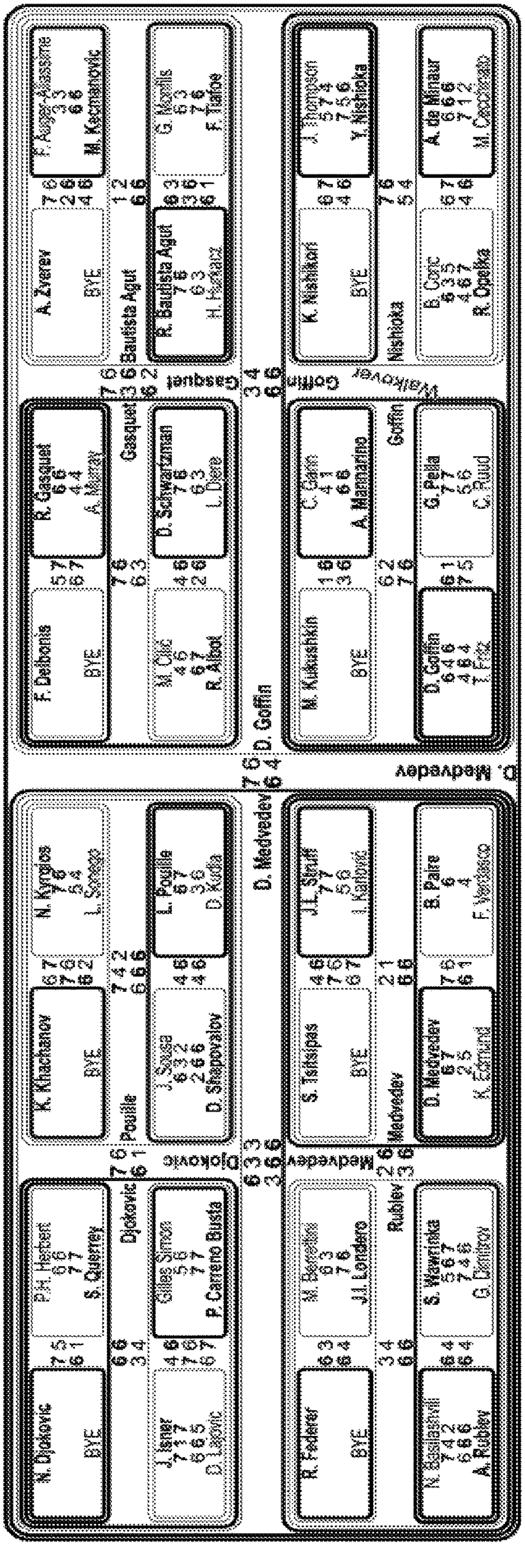
FIG. 5*a* shows an example of a rendering of a 64-size draw that includes BYE contestants.
Figure 5B:
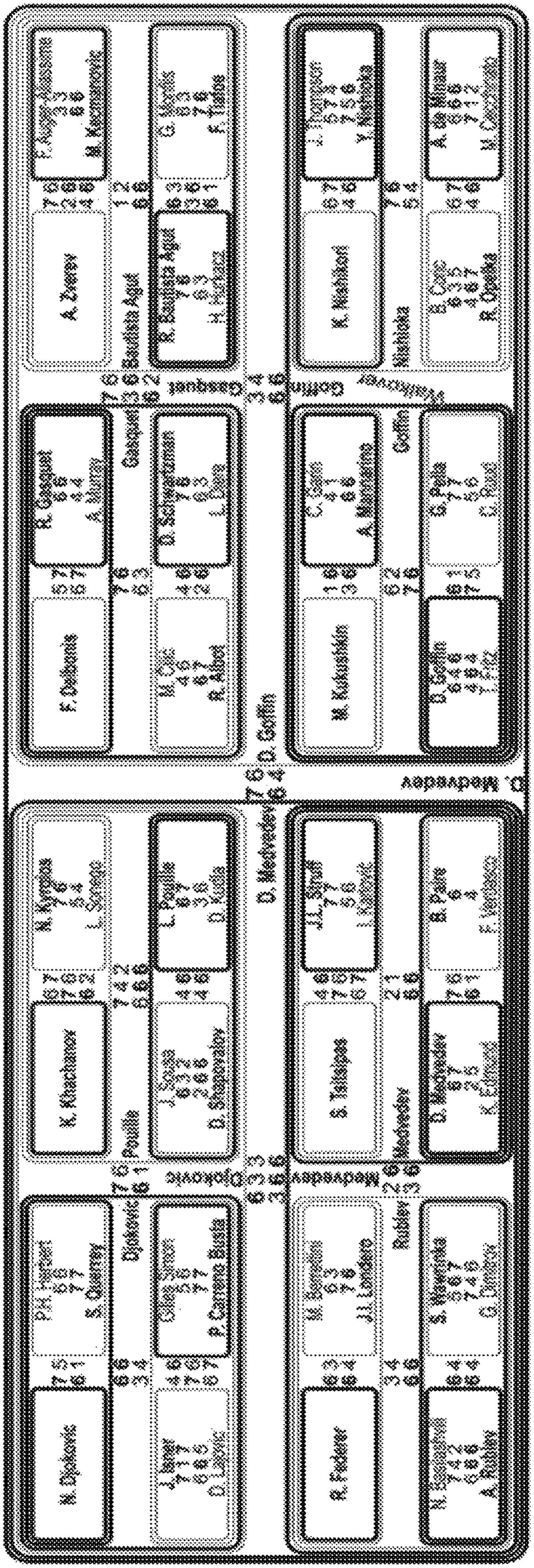
FIG. 5*b* shows an example of a rendering of the FIG. 5*a* draw, in which the renderings of the R(1) brackets that contain BYEs are collapsed to their respective bracket winner.
Figure 6:
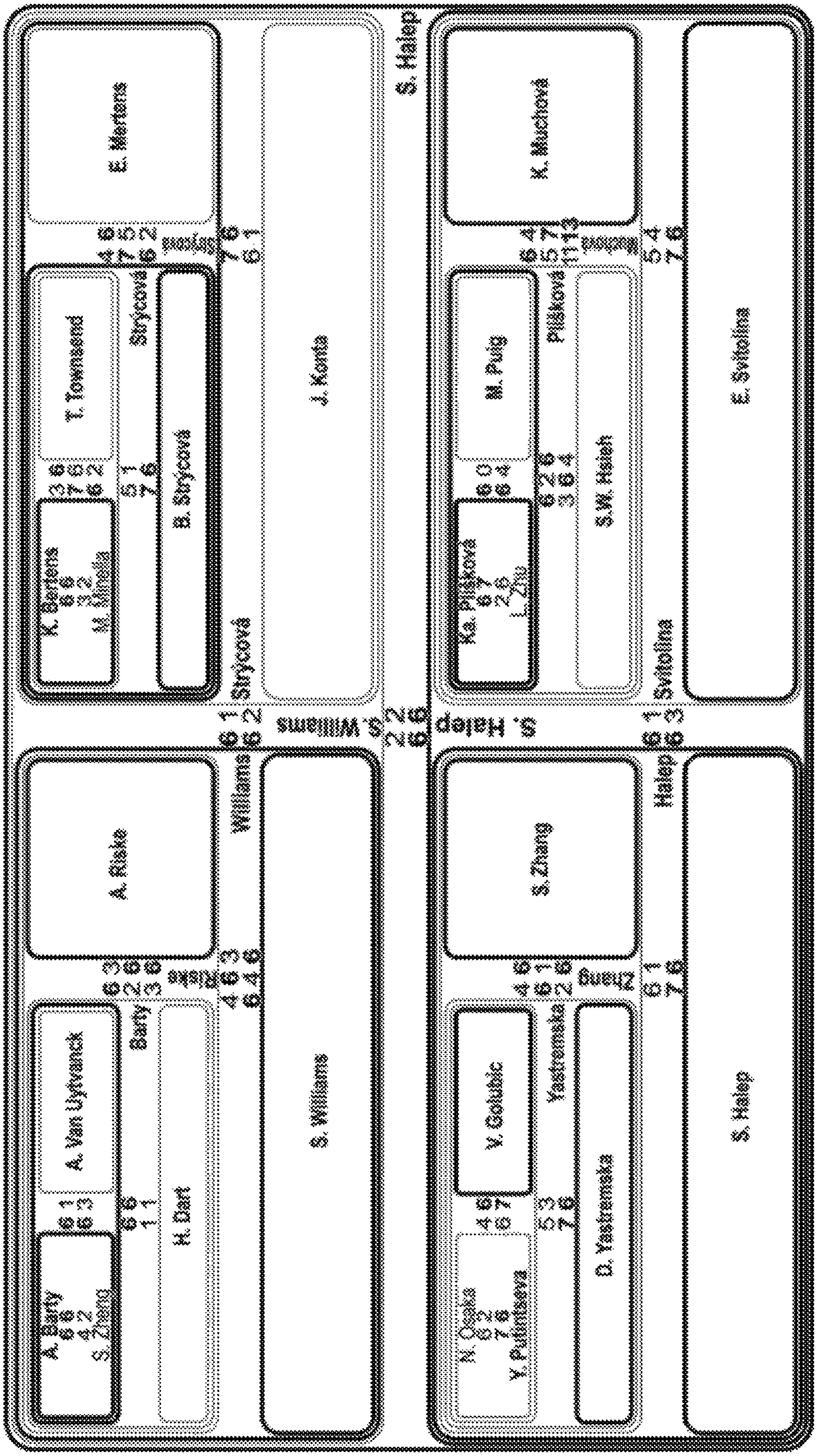
FIG. 6 shows an example of a 128-size draw in which the renderings of several brackets of different rounds are collapsed to their respective bracket winner.

A draw rendering is created as the rendering of the draw's Final bracket. Generally, bracket renderings include the renderings of their child brackets, composed along the direction designated for the round of the current bracket. At the center of the method of the present disclosure is the precept of alternating the direction of composition of bracket pairs between each round and its next round. The essence of the concept is illustrated in FIG. 2*a* and FIG. 2*b*.

Figure 7:
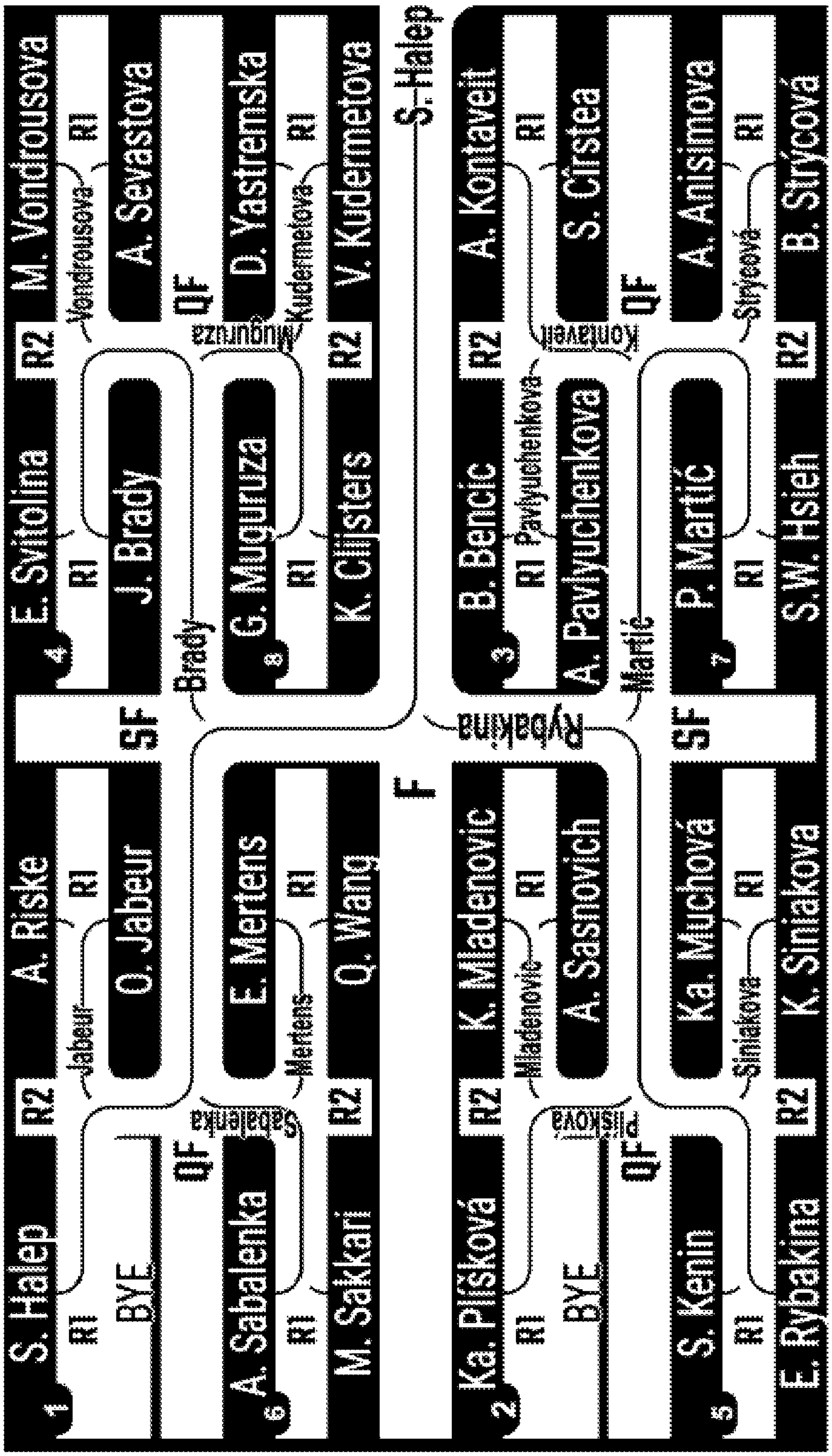
FIG. 7 includes visual elements attached to the R0 brackets, which contain the seed number for all actual seeds; nominal seed numbers are not shown. The draw had been normalized, thereby resulting in all seeds being placed in the top-left corner of their respective seeding bracket. For all participants, their win paths are illustrated with curving lines composed of segments, each segment of one win path being a visual element that belongs to a different bracket, of a different round; for each participant who won in R(1), the end of its win path is annotated with a visual element containing the name of the participant, the visual element being placed in the gap of the bracket of the round in which the participant lost. The bracket renderings additionally contain a visual element placed inside the gap between their respective child bracket renderings, the visual element containing the label of the round of the bracket.
Figure 8:
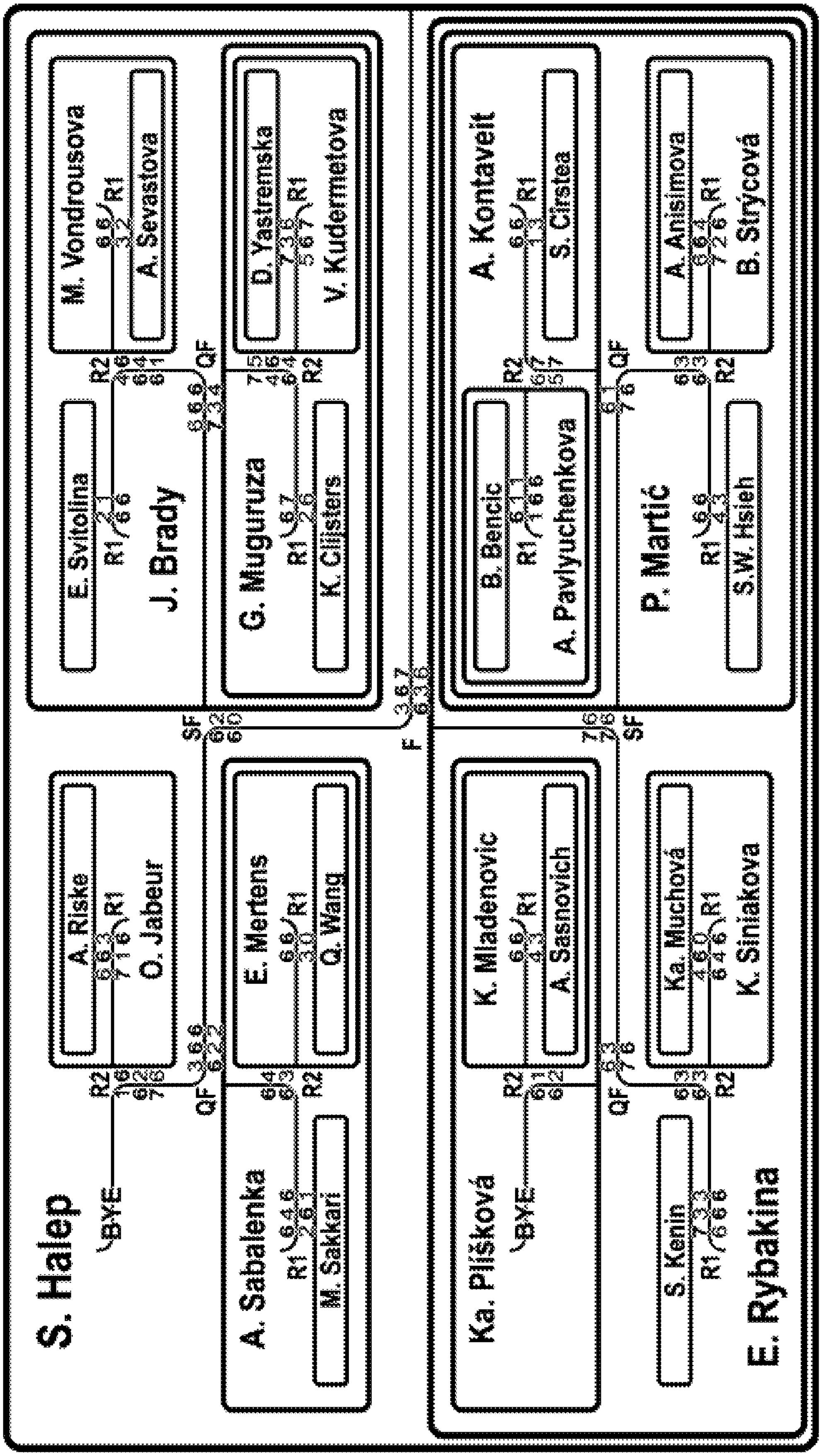
FIG. 8 shows an alternative use of visual elements to indicate the winners of each bracket and the details about the win paths of all participants, including the scores in each round.

It is preferred that, when the R1 list seed numbers are known, the draw be normalized before applying the method, thereby creating a consistent placing of the seeds relative to the brackets. FIG. 7 illustrates the seed placement in a normalized draw.

A draw rendering is created as follows:

I. Generate alternating composition directions for all rounds.
   For each number i, 1≤i≤Nr: a unique direction, "D(i)", is designated for round R(i), such that D(r)=~D(r−1), for each r, 1<r≤Nr. D(i) is the composition direction for all brackets of round R(i). There are two ways of designating the directions D(i) consistently with this rule; one of them must be chosen based on criteria that are outside of the scope of the present method.
II. Create bracket renderings for all brackets of round R0.
   For each position c in the R1 list, 0≤c≤N1: the rendering of bracket B(0, c) is created by placing visual elements associated with B(0, c) inside a straight rectangular area. Bracket B(0, c) being essentially contestant C(c), the associated visual elements normally include the contestant's name.
III. Recursively, create bracket renderings for all brackets with children.
   For each bracket B(r, b), 1<r≤Nr, 0≤b<N(r): the said bracket's rendering is created as a straight rectangular area that encloses:
   i. the renderings of said bracket's child brackets, B(r−1, 2×b) and B(r−1, 2×b+1), composed along direction D(r);
   ii. any spacing area—a gap—between the renderings of the two child brackets;
   iii. any margins around the renderings of the two child brackets;
   iv. visual elements associated with B(r, b), which include visual elements related to M(r, b), W(r, b), R(r).
   The gap or some margins may be trivial—of size 0.

Embodiments

A top-down embodiment is one that creates bracket compositions starting from the constrained boundaries of the parent bracket and fitting the two child brackets—of the previous round—inside, according to the parent bracket's designated direction. At the start, the entire area available for the draw is reserved for the Final bracket; then the area is partitioned to reserve areas for the two child brackets, gap, and margins; the process continues recursively until the areas for the R0 brackets are reserved, always following the current bracket's composition direction.

A bottom-up embodiment is one that creates bracket compositions starting from the child bracket renderings and composing them along their next round's designated direction to create the containing bracket rendering of the next round. The process starts with the R0 bracket renderings. This is detailed under the "Bottom-up, Horizontal-first Embodiment" section below.

By convention, we define D(0)=~D(1). Direction D(0) is not a composition direction, as R(0) brackets do not have child brackets; D(0) can be interpreted as indicating the orientation of the renderings of the R(0) brackets.

A horizontal-first embodiment is one whose D(0) direction is H—horizontal. Conversely, a vertical-first embodiment is one with D(0)=V.

Bottom-Up, Horizontal-First Embodiment

This approach is appropriate when using a computer and it is desired that the rendering has exact, fixed relationships between the sizes and positions of all elements of the rendering. The resulting absolute size and aspect ratio of the draw rendering are fixed. Placing the draw rendering on the display involves a simple geometric transformation such that the draw rendering fits inside the available area.

This embodiment supports collapsed brackets and the highlighting of selected elements of the draw. Collapsed brackets hide superfluous BYE contestants or details that are not relevant in certain contexts. Highlighting is useful when focusing on certain parts of the draw, including when showing the win paths of selected participants, or when emphasizing the elements related to a selected round.

Following, we use "T(r, b)" to refer to the rendering of bracket B(r, b). We write "Size(T, d)" to denote the size of rendering T along direction d; Size(T, H) is the "width" and Size(T, V) is the "height" of rendering T.

In this embodiment, the detailed method consists of the following steps:

I. STEP 1. Receive input information:
   nominal number of rounds: Nr—number of rounds from R1 to Rf, inclusive;
   actual number of rounds: Nz—number of rounds from R1 to Rz, inclusive;
   any known contestant information—the participants referenced by contestant slots;
   any known match information, including time and place, score, winner;
   any bracket that should be collapsed: a set CBin containing the identities of collapsed brackets, not including any brackets without a known winner;
   any visual elements that should be highlighted: a set HE containing the identities of the visual elements to be highlighted.
II. STEP 2. Complete the setting up of sets.
   i. Create set CB of all collapsed brackets, consisting of:
      a. all the brackets from CBin that are not R0 brackets, and
      b. all the brackets whose match is a nominal match and whose parent bracket's match is not a nominal match, thereby specifying that brackets that don't contain actual matches should be collapsed.

ii. Generate set FE of faint visual elements, containing:
a. if HE is empty: nothing;
b. if HE is not empty: all visual element identities of the draw that are not included in set HE.

III. STEP 3. Create renderings for each R0 bracket B(0, c), 0≤c≤N1.

i. Initialize the width and height values, respectively w0 and h0, that will be used for the R0 bracket renderings; w0 should be a sensible multiple of h0, consistent with D(0) being horizontal.

ii. For each c from 0 to N1-1, N1 times, create rendering T(0, c) of bracket B(0, c) as a straight rectangular area, as follows:
a. if B(0, c) is a descendant of a bracket from set CB, then T(0, c) is nil;
b. otherwise, create the rendering inside a straight rectangular area:
The rectangle width is w0 and its height is h0:
Size(T(0, c), H)=w0,
Size(T(0, c), V)=h0.
Inside the rectangular area, create each visual element E associated with B(0, c), rendering E's faint version if and only if its identity is included in FE:
i) if C(c) is empty, the visual element is an empty rectangle;
ii) if C(c) is filled with a participant P, the visual elements include:
name or identifier of P;
seed number of P, if the seed number is actual;
annotations applicable to P, such as "wild card" or country flag;
indicators of the current state of P or C(c), such as using bold weight font for its name if C(c) is the winner of its R1 match.

IV. STEP 4. Recursively compose bracket renderings from R1 to the Final round.
For each r from 1 to Nr:
a. Set composition direction d to H if r is a multiple of 2 and to V if not.
b. Initialize to desired sensible values:
internal margin mY, in direction d;
internal margin mN, in direction ~d;
gap g between child bracket renderings.
c. For each b from 0 to (2^(Nr−r))−1, create T=T(r, b), the rendering of B(r, b):
i) if B(r, b) is a descendant of a bracket from set CB, T is a nil visual element;
ii) if B(r, b) is a bracket from CB, T is the visual element consisting of a rectangle that includes the name of the winner W(r, b);
iii) in all other cases, create rendering T as a composition, along direction d, of T1=T(r−1, 2×b) and T2=T(r−1, 2×b+1), as follows:
a) In direction d, T1 and T2 are positioned, respectively, at coordinates mY and mY+Size (T1, d)+g of T. A margin of size mY is added after T2, so that rendering T has a total size in direction d:

$$\text{Size}\ (T, d) = mY + \text{Size}\ (T1, d) + g + \text{Size}\ (T2, d) + mY;$$

b) In direction ~d, T1 and T2 are positioned at coordinate mN of T. If one of T1 and T2 is larger in direction ~d, of size stN, the smaller one is extended in direction ~d to match the stN size, using empty space padding. A margin of size mN is added after T1 and T2, so that rendering T has a total size in direction ~d:

$$\text{Size}\ (T, {}^{\sim}d) = mN + stN + mN.$$

c) Inside the gap area between the child bracket renderings, create each visual element E associated with B(r, b), rendering E's faint version if and only if its identity is included in FE:
name of round R(r): one of "F", "SF", "QF", "R16", "R32", etc.; information about match M(r, b): scheduling information or score;
if M(r, b) is played, name or identifier of winner W(r, b);
win path segment of the contestants of M(r, b);
any other information associated with B(r, b).

V. STEP 5. Use the rendering of the Final bracket, T(Nr, 0), as the rendering for the whole draw. Apply any simple geometrical transformation necessary to place the draw rendering inside the target area of the visual display.

I claim:

1. A computer-implemented method of rendering an elimination tournament draw for display, the method comprising:

receiving, by a computer system, tournament data comprising a nominal number of rounds Nr for an elimination draw where Nr≥3, and contestant information for a first round;

designating, by the computer system, a composition direction for each round from a set consisting of horizontal and vertical directions, wherein consecutive rounds have crosswise designated directions;

generating, by the computer system using a processor and memory, a bracket rendering for each bracket of pseudo-round R0, each bracket rendering comprising a rectangular area containing visual elements associated with a contestant;

recursively determining, by the computer system, dimensions and positions for bracket renderings corresponding to nodes of a binary tree structure of brackets, for rounds from R1 to the Final round, wherein the rendering of each bracket is composed along the designated direction of the round from the renderings of two child brackets of the previous round, such that:

for each parent bracket rendering of a round and its two child bracket renderings of the previous round, the parent rendering dimensions in the designated direction of the round equal a sum of the two child rendering dimensions in the designated direction, gap values, and margin values, for each parent bracket rendering and its two child bracket renderings, the parent rendering dimensions in the crosswise direction are based on a maximum of the two child rendering dimensions in the crosswise direction and margin values, and the two child bracket renderings are positioned within the parent bracket rendering such that the child bracket renderings are separated by gap values in the designated direction and are substantially aligned in the crosswise direction, wherein each parent bracket rendering includes visual elements associated with the respective bracket, and wherein the determined dimensions and positions are stored in computer memory;

applying a geometric transformation to fit the draw rendering within a target area, wherein the draw rendering is the rendering of the Final bracket of the elimination draw; and causing display of the draw rendering on an electronic display device, wherein the draw rendering comprises a compact rectangular arrangement of all tournament brackets, and wherein the compact rectangular arrangement occupies at least 35% less display area than a traditional column-based tournament bracket arrangement of the same elimination draw having contestant visual elements of equal dimensions, whereby the compact rectangular arrangement eliminates the embedded unused space of the traditional column-based tournament bracket arrangement, providing more uniform distribution of tournament information throughout the rendering.

2. The method of claim 1, further comprising:

optionally receiving a set of bracket identities identifying brackets to be collapsed, wherein no bracket identified in the set is a descendant of another bracket identified in the set;

for each bracket identified in the set of bracket identities, if any:

setting visual elements associated with all descendant brackets of the identified bracket to nil, and creating a collapsed bracket rendering for the identified bracket, the collapsed bracket rendering comprising a visual element identifying the winner of the identified bracket without displaying the descendant bracket renderings;

optionally receiving a set of visual element identities identifying visual elements to be highlighted; and for each bracket of the draw, for each visual element associated with the bracket:

determining whether the visual element is (i) a nil visual element resulting from collapsing brackets, or (ii) identified in the set of visual element identities to be highlighted, if any, and if the visual element is neither a nil visual element nor identified for highlighting, rendering the visual element in a faint appearance having reduced visibility, whereby selectively collapsing brackets and highlighting visual elements facilitates focus on relevant tournament information.

3. The method of claim 2, further comprising:

receiving, via an input device, a user selection of an element of the elimination draw; and in response to receiving the user selection, dynamically updating the draw rendering by determining visual elements associated with the selected element and rendering said associated visual elements with normal visibility while rendering other visual elements with reduced visibility, whereby the user can interactively explore the elimination draw by selecting different elements and viewing corresponding highlighted information.

4. The method of claim 3, wherein the user selection comprises a selection of a participant, and wherein the visual elements associated with the selected element comprise visual elements associated with the win path of the selected participant, such that all matches and opponents of the selected participant are highlighted.

5. The method of claim 3, wherein the user selection comprises a selection of a round, and wherein the visual elements associated with the selected element comprise visual elements associated with the selected round, such that all matches, contestants, and match results of the selected round are highlighted.

6. The method of claim 2, further comprising:

receiving, via an input device, a user selection of one or more brackets to collapse;

in response to receiving the user selection, dynamically collapsing the selected brackets by updating the set of bracket identities to include the selected brackets and regenerating the draw rendering with the selected brackets collapsed; and causing display of the regenerated draw rendering with the selected brackets collapsed, whereby the user can interactively control the level of detail displayed in the elimination draw by selectively collapsing brackets.

7. The method of claim 2, wherein the set of bracket identities comprises identities of brackets whose associated matches are nominal matches and whose parent brackets' associated matches are not nominal matches, thereby automatically collapsing brackets containing only nominal matches.

8. The method of claim 3, further comprising:

storing in computer memory a set of rendering parameters comprising geometric parameters and visual styling parameters, wherein the geometric parameters include R0 bracket dimensions, margin values, and gap values used in recursively determining the bracket renderings, and wherein the visual styling parameters include at least one of colors, fonts, line styles, visibility, or graphical element properties;

receiving, via the input device, a user selection of a presentation style from a plurality of presentation styles, wherein each presentation style emphasizes different tournament information aspects and is associated with a different set of rendering parameter values;

in response to receiving the user selection of the presentation style:

updating the set of rendering parameters stored in memory with the rendering parameter values associated with the selected presentation style, regenerating the draw rendering by performing the recursive determination of bracket renderings using the updated rendering parameters, and applying a geometric transformation to fit the regenerated draw rendering within the target area; and causing display of the transformed regenerated draw rendering, whereby users can dynamically select presentation with different visual characteristics determined by presentation-style-specific rendering parameters.

9. A system for rendering an elimination tournament draw for display, the system comprising:

a processor;

a memory; and an electronic display device, wherein the processor is configured to:

receive tournament data comprising a nominal number of rounds Nr for an elimination draw where $Nr \geq 3$, and contestant information for a first round;

designate a composition direction for each round from a set consisting of horizontal and vertical directions, wherein consecutive rounds have crosswise designated directions;

generate a bracket rendering for each bracket of pseudo-round R0, each bracket rendering comprising a rectangular area containing visual elements associated with a contestant;

recursively determine dimensions and positions for bracket renderings corresponding to nodes of a binary tree structure of brackets, for rounds from R1 to the Final round, wherein the rendering of each bracket is composed along the designated direction of the round from the renderings of two child brackets of the previous round, such that:

for each parent bracket rendering of a round and its two child bracket renderings of the previous round, the parent rendering dimensions in the designated direction of the round equal a sum of the two child rendering dimensions in the designated direction, gap values, and margin values, for each parent bracket rendering and its two child bracket renderings, the parent rendering dimensions in the crosswise direction are based on a maximum of the two child rendering dimensions in the crosswise direction and margin values, and the two child bracket renderings are positioned within the parent bracket rendering such that the child bracket renderings are separated by gap values in the designated direction and are substantially aligned in the crosswise direction, wherein each parent bracket rendering includes visual elements associated with the respective bracket, and wherein the determined dimensions and positions are stored in the memory;

apply a geometric transformation to fit the draw rendering within a target area, wherein the draw rendering is the rendering of the Final bracket of the elimination draw; and cause display of the draw rendering on an electronic display device, wherein the draw rendering comprises a compact rectangular arrangement of all tournament brackets, and wherein the compact rectangular arrangement occupies at least 35% less display area than a traditional column-based tournament bracket arrangement of the same elimination draw having contestant visual elements of equal dimensions, whereby the compact rectangular arrangement eliminates the embedded unused space of the traditional column-based tournament bracket arrangement, providing more uniform distribution of tournament information throughout the rendering.

10. The system of claim 9, wherein the processor is further configured to:

optionally receive a set of bracket identities identifying brackets to be collapsed, wherein no bracket identified in the set is a descendant of another bracket identified in the set;

for each bracket identified in the set of bracket identities, if any:

set visual elements associated with all descendant brackets of the identified bracket to nil, and create a collapsed bracket rendering for the identified bracket, the collapsed bracket rendering comprising a visual element identifying the winner of the identified bracket without displaying the descendant bracket renderings;

optionally receive a set of visual element identities identifying visual elements to be highlighted; and for each bracket of the draw, for each visual element associated with the bracket:

determine whether the visual element is (i) a nil visual element resulting from collapsing brackets, or (ii) identified in the set of visual element identities to be highlighted, if any, and if the visual element is neither a nil visual element nor identified for highlighting, render the visual element in a faint appearance having reduced visibility, whereby selectively collapsing brackets and highlighting visual elements facilitates focus on relevant tournament information.

11. The system of claim 10, further comprising an input device, wherein the processor is further configured to:

receive, via the input device, a user selection of an element of the elimination draw; and in response to receiving the user selection, dynamically update the draw rendering by determining visual elements associated with the selected element and rendering said associated visual elements with normal visibility while rendering other visual elements with reduced visibility, whereby the user can interactively explore the elimination draw by selecting different elements and viewing corresponding highlighted information.

12. The system of claim 10, further comprising an input device, wherein the processor is further configured to:

receive, via the input device, a user selection of one or more brackets to collapse;

in response to receiving the user selection, dynamically collapse the selected brackets by updating the set of bracket identities to include the selected brackets and regenerating the draw rendering with the selected brackets collapsed; and cause display of the regenerated draw rendering with the selected brackets collapsed, whereby the user can interactively control the level of detail displayed in the elimination draw by selectively collapsing brackets.

13. A non-transitory computer-readable medium storing instructions that, when executed by a processor of a computer system having a memory and an electronic display device, cause the processor to:

receive tournament data comprising a nominal number of rounds Nr for an elimination draw where Nr>3, and contestant information for a first round;

designate a composition direction for each round from a set consisting of horizontal and vertical directions, wherein consecutive rounds have crosswise designated directions;

generate a bracket rendering for each bracket of pseudo-round R0, each bracket rendering comprising a rectangular area containing visual elements associated with a contestant;

recursively determine dimensions and positions for bracket renderings corresponding to nodes of a binary tree structure of brackets, for rounds from R1 to the Final round, wherein the rendering of each bracket is composed along the designated direction of the round from the renderings of two child brackets of the previous round, such that:

for each parent bracket rendering of a round and its two child bracket renderings of the previous round, the parent rendering dimensions in the designated direction of the round equal a sum of the two child rendering dimensions in the designated direction, gap values, and margin values, for each parent bracket rendering and its two child bracket renderings, the parent rendering dimensions in the crosswise direction are based on a maximum of the two child rendering dimensions in the crosswise direction and margin values, and the two child bracket renderings are positioned within the parent bracket rendering such that the child bracket renderings are separated by gap values in the designated direction and are substantially aligned in the crosswise direction, wherein each parent bracket rendering includes visual elements associated with the respective bracket, and wherein the determined dimensions and positions are stored in the memory;

apply a geometric transformation to fit the draw rendering within a target area, wherein the draw rendering is the rendering of the Final bracket of the elimination draw; and cause display of the draw rendering on an electronic display device, wherein the draw rendering comprises a compact rectangular arrangement of all tournament brackets, and wherein the compact rectangular arrangement occupies at least 35% less display area than a traditional column-based tournament bracket arrangement of the same elimination draw having contestant visual elements of equal dimensions, whereby the compact rectangular arrangement eliminates the embedded unused space of the traditional column-based tournament bracket arrangement, providing more uniform distribution of tournament information throughout the rendering.

14. The non-transitory computer-readable medium of claim 13, wherein the instructions further cause the processor to:

optionally receive a set of bracket identities identifying brackets to be collapsed, wherein no bracket identified in the set is a descendant of another bracket identified in the set;

for each bracket identified in the set of bracket identities, if any:

set visual elements associated with all descendant brackets of the identified bracket to nil, and create a collapsed bracket rendering for the identified bracket, the collapsed bracket rendering comprising a visual element identifying the winner of the identified bracket without displaying the descendant bracket renderings;

optionally receive a set of visual element identities identifying visual elements to be highlighted; and for each bracket of the draw, for each visual element associated with the bracket:

determine whether the visual element is (i) a nil visual element resulting from collapsing brackets, or (ii) identified in the set of visual element identities to be highlighted, if any, and if the visual element is neither a nil visual element nor identified for highlighting, render the visual element in a faint appearance having reduced visibility, whereby selectively collapsing brackets and highlighting visual elements facilitates focus on relevant tournament information.

15. The non-transitory computer-readable medium of claim 14, wherein the computer system further comprises an input device, and wherein the instructions further cause the processor to:

receive, via the input device, a user selection of an element of the elimination draw; and in response to receiving the user selection, dynamically update the draw rendering by determining visual elements associated with the selected element and rendering said associated visual elements with normal visibility while rendering other visual elements with reduced visibility, whereby the user can interactively explore the elimination draw by selecting different elements and viewing corresponding highlighted information.

16. The non-transitory computer-readable medium of claim 14, wherein the computer system further comprises an input device, and wherein the instructions further cause the processor to:

receive, via the input device, a user selection of one or more brackets to collapse;

in response to receiving the user selection, dynamically collapse the selected brackets by updating the set of bracket identities to include the selected brackets and regenerating the draw rendering with the selected brackets collapsed; and cause display of the regenerated draw rendering with the selected brackets collapsed, whereby the user can interactively control the level of detail displayed in the elimination draw by selectively collapsing brackets.

* * * * *